(12) United States Patent
Chen et al.

(10) Patent No.: US 8,374,223 B2
(45) Date of Patent: Feb. 12, 2013

(54) BOC SIGNAL ACQUISITION AND TRACKING METHOD AND APPARATUS

(75) Inventors: Chun-nan Chen, Taipei (TW); Kun-tso Chen, Chang-Hua Hsien (TW); Jui-ming Wei, Taichung (TW)

(73) Assignee: Mediatek Inc., Hsin-Chu (TW)

( * ) Notice: Subject to any disclaimer, the term of this patent is extended or adjusted under 35 U.S.C. 154(b) by 376 days.

(21) Appl. No.: 12/757,994

(22) Filed: Apr. 10, 2010

(65) Prior Publication Data

US 2010/0195746 A1   Aug. 5, 2010

Related U.S. Application Data

(63) Continuation of application No. 11/616,610, filed on Dec. 27, 2006, now abandoned.

(51) Int. Cl.
*H04B 1/00* (2006.01)
(52) U.S. Cl. .................... 375/150; 375/147; 375/140
(58) Field of Classification Search ............. 375/150
See application file for complete search history.

(56) References Cited

U.S. PATENT DOCUMENTS

| | | | |
|---|---|---|---|
| 6,922,167 B2 | 7/2005 | Gerein | |
| 7,471,241 B1 | 12/2008 | Yang | |
| 2003/0231580 A1 | 12/2003 | Martin et al. | |
| 2005/0012664 A1 | 1/2005 | Gerein | |
| 2005/0270997 A1* | 12/2005 | Julien et al. | 370/315 |
| 2005/0281325 A1 | 12/2005 | Lillo et al. | |
| 2007/0195867 A1* | 8/2007 | Betz et al. | 375/152 |
| 2007/0258511 A1 | 11/2007 | Knight et al. | |
| 2007/0274374 A1* | 11/2007 | Abraham | 375/148 |
| 2008/0069187 A1 | 3/2008 | Chen et al. | |
| 2008/0137714 A1* | 6/2008 | Lionel et al. | 375/130 |
| 2009/0046766 A1 | 2/2009 | Avellone et al. | |

FOREIGN PATENT DOCUMENTS

FR   2853967 A1   10/2004

* cited by examiner

*Primary Examiner* — Erin File

(57) ABSTRACT

A BOC signal acquisition and tracking apparatus and method. In the present invention, at least a BOC signal, a BOC-cos signal and a PRN coded signal are generated for a received signal. Depending on application condition (e.g. acquisition mode or tracking mode), autocorrelation of the BOC signal is combined with cross-correlation of the BOC signal and one of the BOC-cos signal and the PRN coded signal to generate a proper combined correlation result.

20 Claims, 5 Drawing Sheets

BOC SIGNAL ACQUISITION AND TRACKING METHOD AND APPARATUS

CROSS-REFERENCE TO RELATED APPLICATIONS

This is a continuation of application Ser. No. 11/616,610, filed Dec. 27, 2006 now abandoned.

TECHNICAL FIELD OF THE INVENTION

The present invention relates to processing of binary offset carrier (BOC) modulated signals (simply referred to as BOC signal hereinafter), more particularly, to a method and apparatus for processing BOC signals in acquisition and tracking modes of a satellite navigation receiver.

BACKGROUND OF THE INVENTION

Nowadays, more than one Global Navigation Satellite System (GNSS) is available. A receiver supporting multi-specification LBS (location based service), wireless multimedia communication and broadcasting signals is becoming an expectation. Take multi-specification LBS as an example, such a receiver able to support multi-mode receiving for GNSS signals can enhance locating precision and access to more services. Among the GNSS systems, different signal frequency bands support different services. As more and more bands need to be supported, band overlapping occurs.

GPS is the U.S. navigation satellite system, which is a network of satellites continuously transmits high-frequency radio signals. The signals carry time and distance information that is receivable by a GPS receiver, so that a user can pinpoint the position thereof on the earth. Galileo, the emerging European satellite navigation system, offers higher signal power and more robust modulation that will enable users to receive weak signals even in difficult environments. When combined, Galileo and GPS will offer twice the number of satellite sources as currently available. This provides redundancy as well as greater availability for the user. The combination of GPS and Galileo basically has four bands, excluding SAR (Safe and Rescue) service. GPS and Galileo systems share some signal bands. That is, GPS and Galileo share some central frequencies and send signals on the same ones of carriers. For example, GPS L1 and Galileo E2-L1-E1 share the same band. To reduce inter-system and intra-system interference, specific modulation schemes are required. Binary offset carrier modulation (hereinafter simply referred to as "BOC") is a widely used method.

The BOC modulation is done by multiplying a pseudo-random noise (PRN) spreading coded signal (simply referred to as PRN coded signal hereinafter) with a square wave subcarrier (SC). The SC has a frequency which is multiple of the code rate of the PRN spreading code. FIG. 1 is a waveform diagram showing the BOC modulation. The BOC-sine (simply referred to as BOC) signal is generated by mixing a SC-sine and a PRN coded signal, while the BOC-cos (also referred to as QBOC, where Q indicates "quadrature-phase".) is generated by mixing an SC-cos and the PRN coded signal.

The BOC signal has a symmetric split spectrum with two main lobes shifted from the center frequency by the frequency of the subcarrier. The characteristics of the BOC signal are dependent on the spreading code chip rate, the subcarrier frequency, and the subcarrier phasing within one PRN code chip. The common notation for a BOC-modulated signals in the GNSS field is represented as BOC($f_c$, $f_s$), where $f_c$ is the code chip rate, and L is the frequency of the subcarrier. Both $f_c$ and $f_s$ are usually represented as a multiple of the reference frequency 1.023 MHz. Therefore, the BOC signal can also be represented as BOC(n,m), where n is the multiple of 1.023 MHz for the PRN code chip rate $f_c$, and m is the multiple of 1.023 MHz for the subcarrier $f_s$.

For satellite signal navigation, the BOC signal is preferably applied in tracking under white noises. Such scheme provides better inherent multipath mitigation compared to the spreading code alone. However, BOC scheme makes acquisition and tracking more difficult due to a multiple peak autocorrelation phenomenon. The presence of the subcarrier in the BOC signal introduces secondary peaks in a range of −1/+1 chip in BOC autocorrelation. FIG. 2 is a diagram showing autocorrelation of BOC(1,1). That is, BOC(1,1) correlates with BOC(1,1). As shown, there are two troughs at both sides of the main peak in the middle. To calculate correlation power, square of correlation is usually used. Accordingly, the two troughs will cause two secondary peaks in view of correlation power. Such secondary peaks may cause a problem of mis-lock. That is, a receiver may lock the secondary peak rather than the main peak, and therefore resulting in erroneous tracking. A significant deviation of approximately 150 m would occur in the range measurement. Such an error is unacceptable in navigation.

In addition, the width of the main lobe (main peak) of the BOC correlation result influences the performance of the receiver in acquisition and tracking. If the main lobe is narrow, it is good for tracking and position because a more accurate code phase can be tracked. However, a narrow main lobe makes it difficult to acquire the signal because the narrow correlation function leads to a finer code phase searching space, which needs longer acquisition time.

SUMMARY OF THE INVENTION

An objective of the present invention is to provide a BOC signal acquisition and tracking apparatus. The apparatus comprises a carrier unit generating a carrier; a code unit generating a plurality of subcarriers including at least a BOC subcarrier, a BOC-cos subcarrier, for example, as well as a PRN code, and outputting the BOC subcarrier as well as one of BOC-cos subcarrier and the PRN code; and a code delay estimator receiving a signal, removing a carrier component from said signal by using said carrier from the carrier unit, generating a BOC signal for the received signal by using the BOC subcarrier and generating a BOC-cos signal or a PRN coded signal for the signal by using one of the BOC-cos subcarrier and the PRN code, calculating an autocorrelation of the BOC signal and a cross-correlation of the BOC signal and one of the BOC-cos signal and the PRN coded signal, and combining said autocorrelation and said cross-correlation to generate a combined correlation. The apparatus has a controller controlling the carrier unit, the code unit and the code delay estimator. The controller controls the code unit to output the BOC-cos subcarrier or the PRN code. For example, in signal acquisition mode, the controller controls the code unit to output the BOC subcarrier and BOC-cos subcarrier; while in signal tracking mode, the controller controls the code unit to output the BOC subcarrier and the PRN code. Accordingly, the code estimator can properly generate a combined correlation based on built-in algorithms.

Another objective of the present invention is to provide a BOC signal acquisition and tracking method. The method comprising receiving a signal; generating a carrier; generating subcarriers including at least a BOC subcarrier, a BOC-cos subcarrier, for example, as well as a PRN code; outputting the BOC subcarrier and selecting to output one of the BOC-cos subcarrier and said PRN code; removing a carrier component from the received signal by using said carrier; generating a BOC signal for the signal by using the BOC subcarrier; generating one of a BOC-cos signal and a PRN coded signal for the signal by using one of the BOC-cos subcarrier and the PRN code; calculating an autocorrelation of the BOC signal; calculating a cross-correlation of the BOC signal and one of the BOC-cos signal and the PRN code signal; and combining the autocorrelation and the cross-correlation to generate a combined correlation. For example, in signal acquisition mode, the BOC subcarrier and BOC-cos subcarrier are output; while in signal tracking mode, the BOC subcarrier and the PRN code are output. Accordingly, the combined correlation can be properly generated based on built-in algorithms.

BRIEF DESCRIPTION OF THE DRAWINGS

The present invention will be further described in details in conjunction with the accompanying drawings.

DETAILED DESCRIPTION OF THE INVENTION

Figure 1:
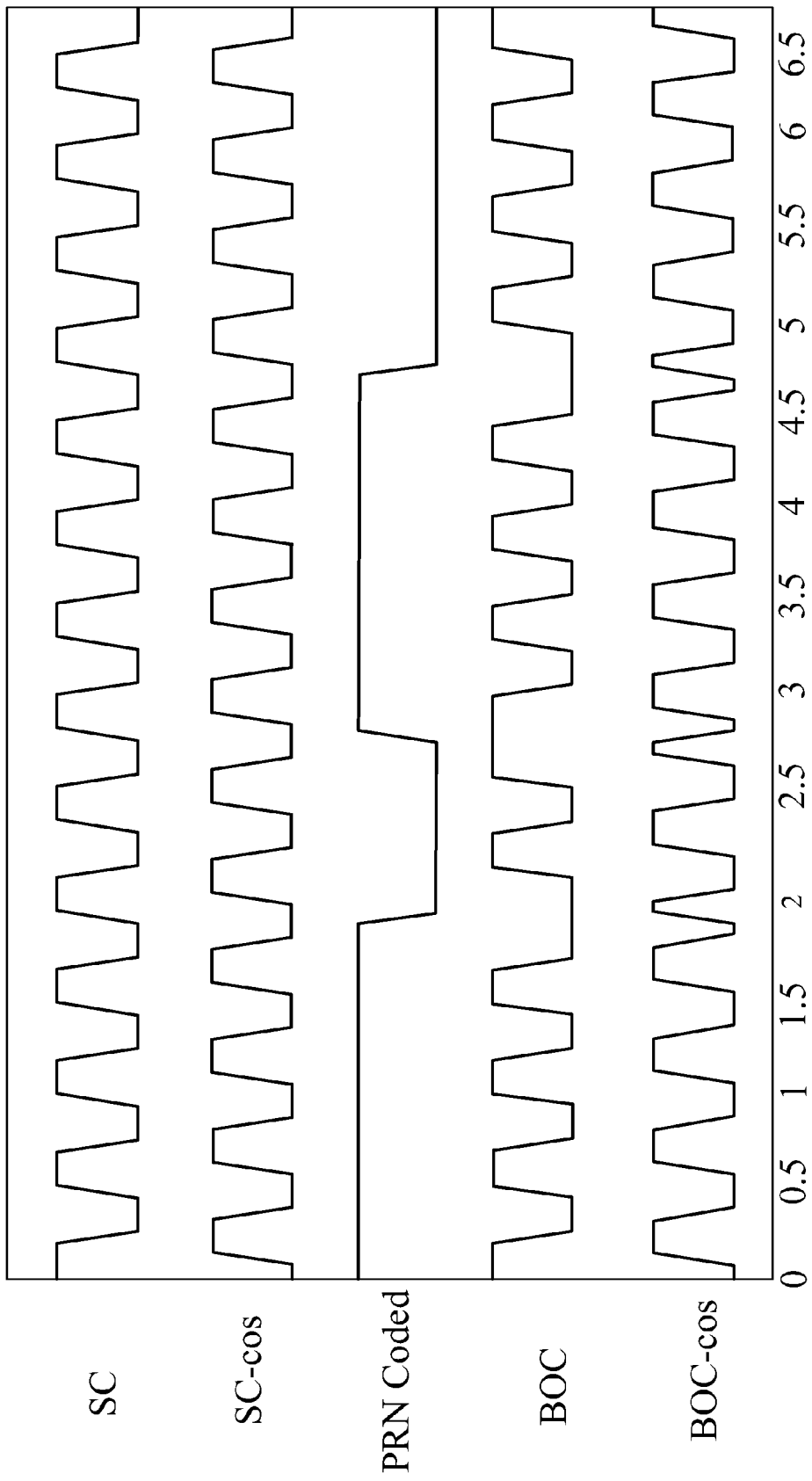
FIG. 1 is a waveform diagram showing generation of BOC and BOC-cos signals.
Figure 2:
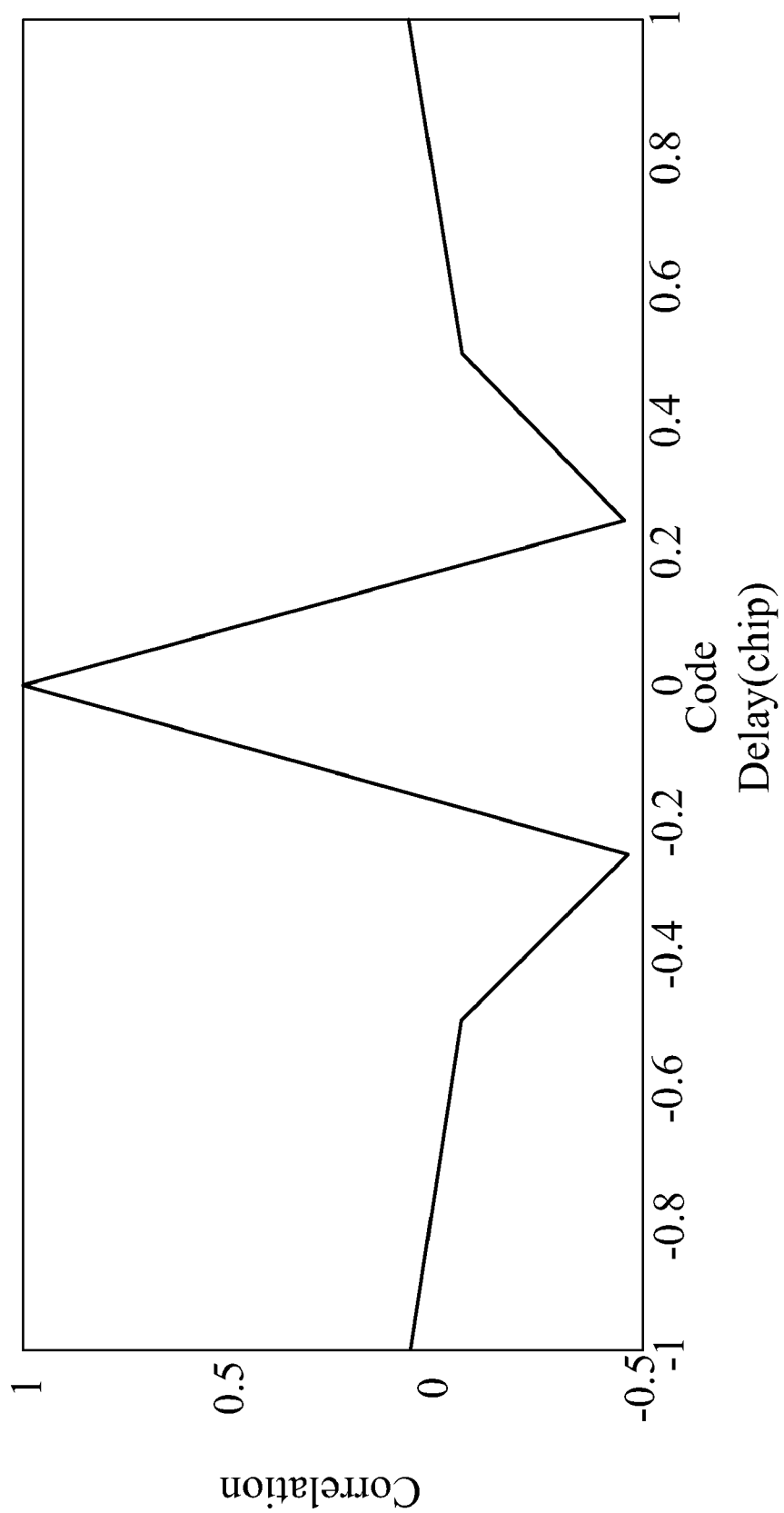
FIG. 2 shows correlation result of BOC (1,1) autocorrelation.
Figure 3:
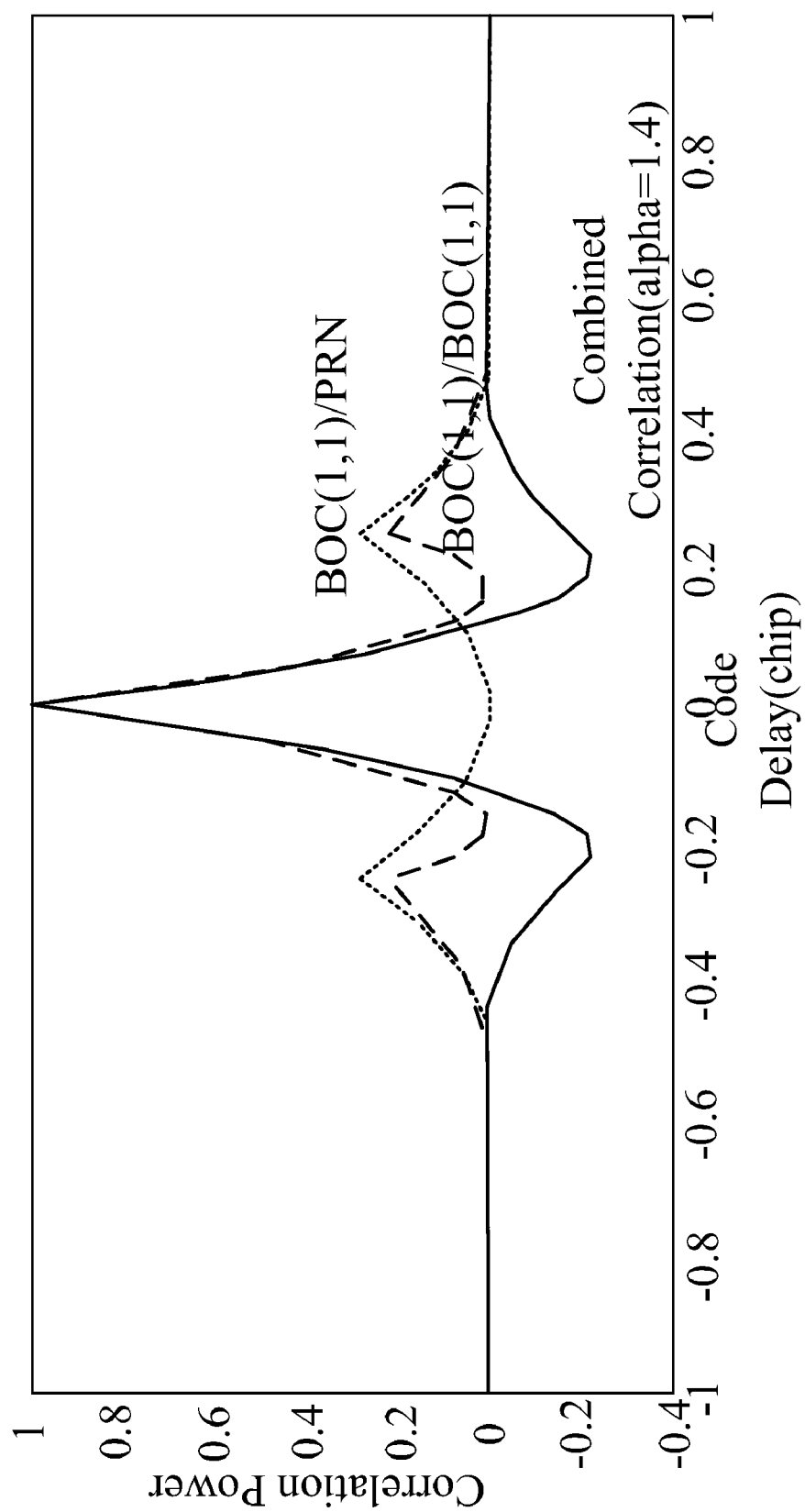
FIG. 3 shows correlation powers of cross-correlation of BOC (1,1)/PRN code, autocorrelation of BOC (1,1) and a combined correlation of the both with a specific coefficient.

As mentioned above, secondary peaks of a BOC signal due to a subcarrier is undesirable. A method to remove the secondary peaks is a combined correlation function. As shown in FIG. 3, correlation power of autocorrelation of BOC (1,1) (i.e. BOC (1,1) correlates with BOC (1,1)) provides curve with a main peak and two side peaks (or secondary peaks). In addition, cross-correlation of BOC (1,1) and PRN code provides a curve with two side peaks but without the main peak. By properly combining autocorrelation of BOC (1, 1) (i.e. BOC (1,1)/BOC(1,1)) and cross-correlation of BOC (1,1) and PRN code (i.e. BOC (1,1)/PRN), side peaks can be effectively removed. The correlation combination function can be expressed as $$R_{combi} = R^2_{BOC/BOC}(\tau) - \alpha \times R^2_{BOC/PRN}(\tau) \quad (1)$$

where $\tau$ is code delay in chips, and $\alpha$ is a variable coefficient. In FIG. 3, BOC (1,1) is used and $\alpha$ is 1.4. As can be seen, the combined correlation power curve has a narrower main lobe with a significantly high peak, but has no side peaks. Such a function is preferably applied in signal tracking for the sake of better accuracy.

Figure 4:
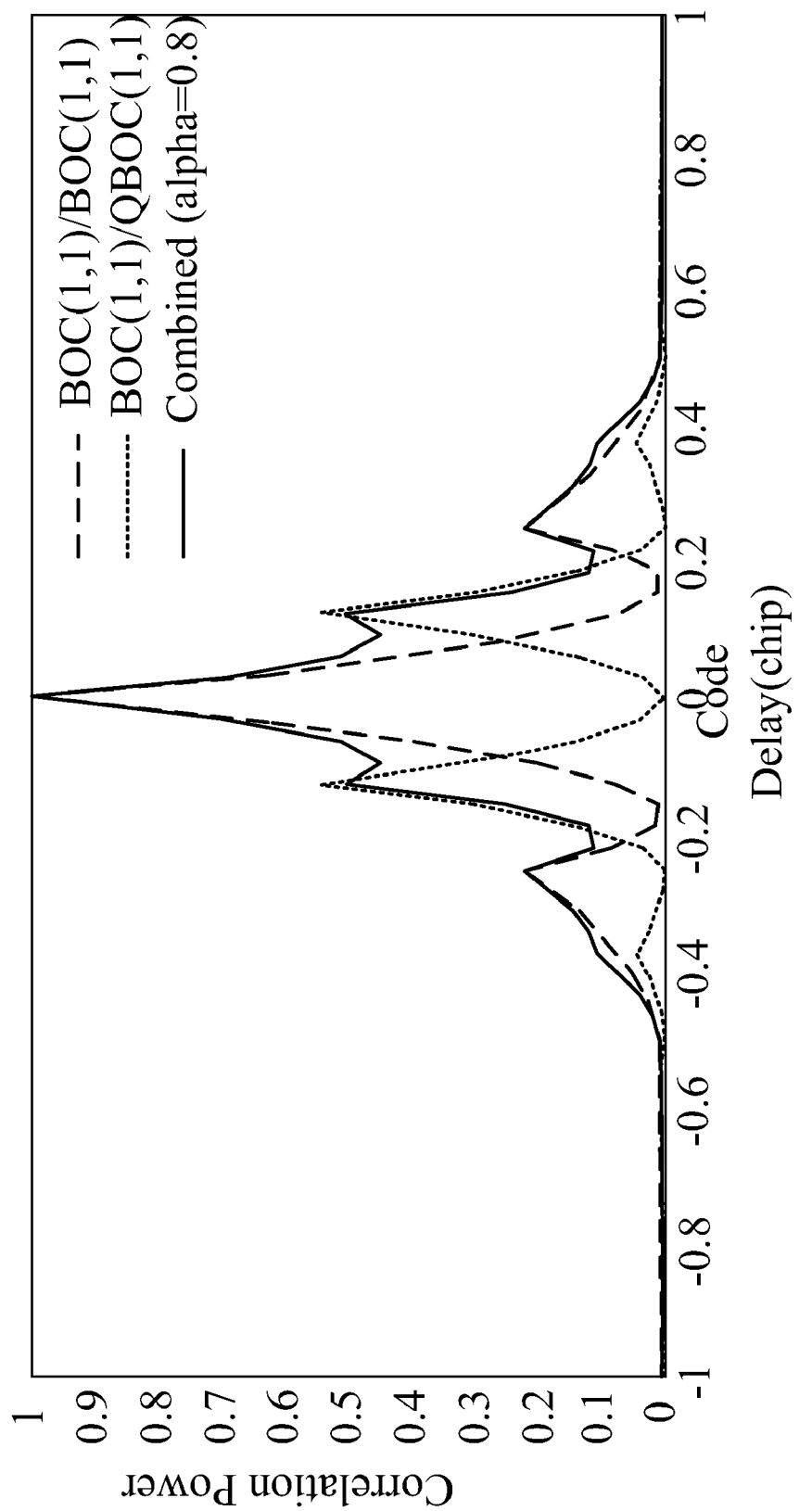
FIG. 4 shows correlation powers of autocorrelation of BOC (1,1) cross-correlation of BOC (1,1)/QBOC (1,1), and a combined correlation of the both with a specific coefficient.

To rapidly acquire a signal, it is preferred that the correlation curve has a wide main lobe. A method to obtain a wide correlation function while reduce side peaks is combining BOC autocorrelation and cross-correlation of BOC and BOC-cos (QBOC). FIG. 4 shows correlation power curves of BOC (1,1)/BOC (1,1) and BOC (1,1)/QBOC (1,1). By adding the both with a proper coefficient, a resultant combined correlation with a wide main lobe can be obtained. The combining function can be expressed as:

$$R_{combi} = R^2_{BOC/BOC}(\tau) + \beta \times R^2_{BOC/QBOC}(\tau) \quad (2)$$

where $\tau$ is code delay in chips, and $\beta$ is a variable coefficient. In FIG. 3, BOC (1,1) and QBOC (1,1) are used and $\beta$ is 0.8. As shown, the combined correlation has a wide-shaped main lobe. Although there still are side peaks existing, the side peaks have been somewhat reduced and smoothed. Such a function is suitable for signal acquisition.

It is noted that in either correlation combination, the coefficient ($\alpha$, $\beta$) is variable as desired.

Figure 5:
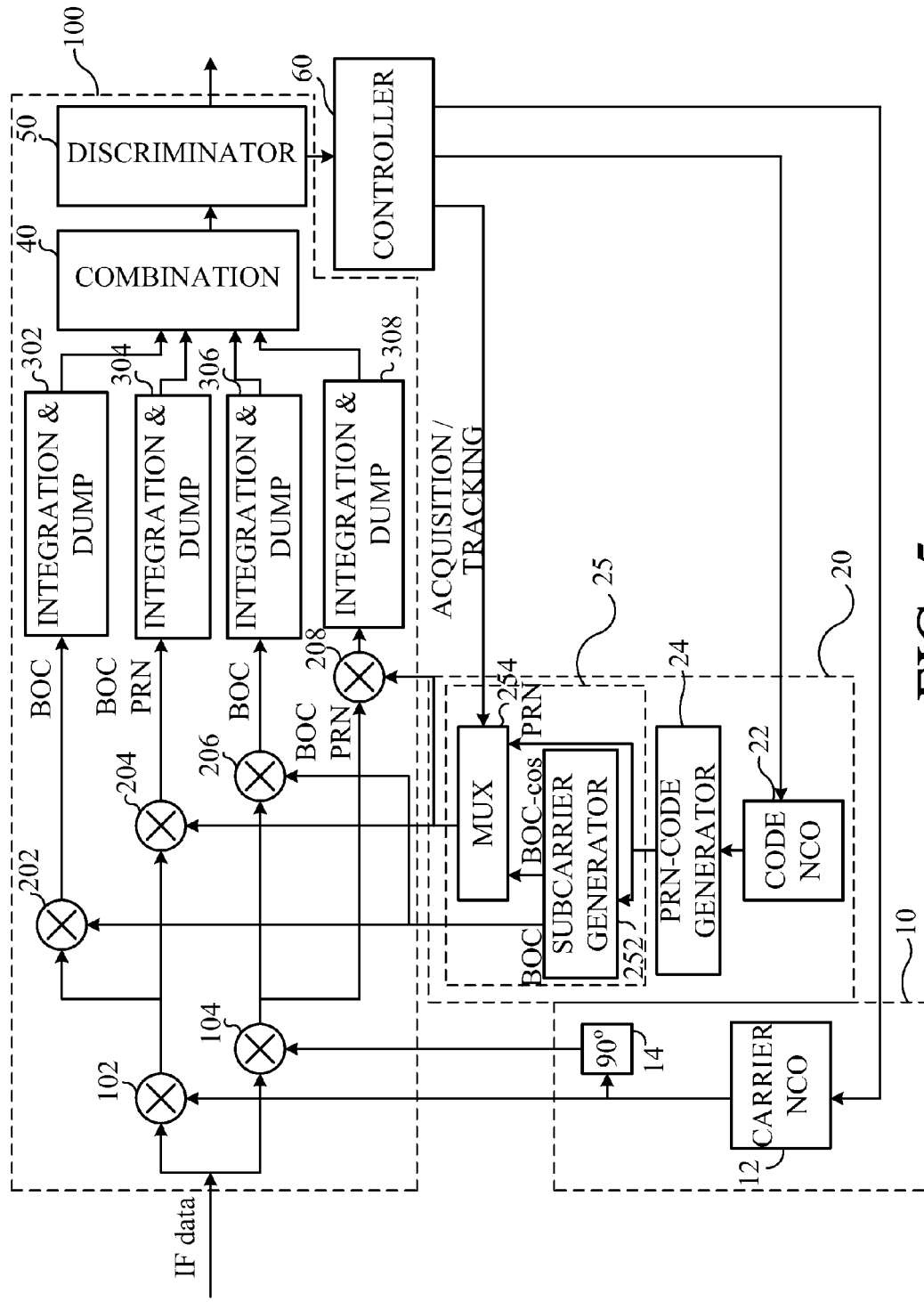
FIG. 5 is a block diagram showing a BOC signals acquisition and tracking apparatus in accordance with the present invention.

FIG. 5 is a block diagram schematically showing a BOC signal acquisition and tracking apparatus in accordance with the present invention. The apparatus can be implemented as a portion of a GNSS signal receiver (e.g. a GPS receiver). The apparatus receives incoming IF data from an RF frond end of a GNSS receiver, for example. Reference number 10 indicates a carrier unit, which provides a carrier signal to carrier mixers 102 and 104 to remove IF component from the data. The carrier signal can be generated by a local oscillator, which is implemented by a carrier numeral controlled oscillator 12. Reference number 14 indicates a phase shifter. The IF-removed signal in I and Q channels are then fed to mixers 202 and 204, 206 and 208, respectively. Block 20 is referred to as a code unit. In accordance with the present invention, the code unit 20 comprises a code numeral controlled oscillator 22 for providing a code signal, a PRN code generator 24 receiving the code signal from the code NCO 22 to generate the PRN code, and a pulse shaping unit 25. The pulse shaping unit 25 receives the PRN code to generate a BOC subcarrier and BOC-cos subcarrier by using the PRN code. The subcarriers are generated by a subcarrier generator 252 in the pulse shaping unit 25. The pulse shaping unit 25 outputs the BOC subcarrier as well as one of the BOC-cos (QBOC) subcarrier and the PRN code. The pulse shaping unit 25 has a multiplexer 254 receiving the BOC-cos (QBOC) subcarrier and the PRN code, and selecting to output one of the both.

The BOC subcarrier is provided to the mixers 202 and 206, so that BOC signal is generated in I and Q channels. The selected output from the multiplexer 254 is fed to the mixers 204 and 208. When the selected output is the BOC-cos subcarrier, a BOC-cos (QBOC) signal is generated. When the selected output is the PRN code, a PRN coded signal is generated. The outputs of the mixers 202, 204, 206, 208, which are referred to as code mixers, are fed into integration and dump units 302, 304, 306, 308, respectively, to be integrated and dumped. Then the integrated results from the integration and dump units 302, 304, 306, 308 are fed to a combination unit 40. The combination unit 40 synthesizes the integration results by combining the integration results from units 302 and 304 to obtain combined correlation in I channel and combining the integration results from units 306 and 308 to obtain combined correlation in Q channel. The combination unit 40 combines the integration results based on the equations (1) or (2). In addition, the coefficient $\alpha$ or $\beta$ is determined in the combination unit 40 in the present embodiment. However, the coefficient $\alpha$ or $\beta$ can also be externally provided to the combination unit 40.

An output of the combination unit 40 is fed to a discriminator 50, which outputs a tracking error from the received correlation to feed back to the carrier unit 10 and code unit 20, so that these units can execute proper adjustments. The mixers 102, 104, 202, 204, 206, 208, integration and dump units 302, 304, 306, 308, combination unit 40 and discriminator 50 compose a code delay estimator 100.

The apparatus in accordance with the present invention further has a controller 60. The controller 60 controls the carrier NCO 12, the code NCO 22 and the multiplexer 254. For example, the controller 60 controls the multiplexer 254 to output the BOC-cos signal in signal acquisition mode while controls the multiplexer 254 to output the PRN code in signal tracking mode. The controller 60 can receive an external command and controls the respective units accordingly. In another embodiment, the coefficient α or β used in the combination unit 40 is determined by the controller 60.

Although the BOC-sine signal (BOC signal), the BOC-cos signal (QBOC signal) as well as PRN code are described in the embodiment, other signals combination, such as a BOC signal with a BOC harmonic signal and/or BOC-cos harmonic signal thereof, can be used. Here, the so called BOC harmonic signal indicates BOC of a multiple of $f_s$, For example, a double frequency harmonic subcarrier of the BOC subcarrier is represented as BOC-sin($2f_s$), and a double frequency harmonic subcarrier of the BOC-cos subcarrier is represented as BOC-cos($2f_s$). The rest can be deduced accordingly.

In addition, in the above embodiment, the code unit 20 outputs PRN code, BOC subcarrier and BOC-cos subcarrier. However, more than the PRN code and the above two subcarriers can be generated and output by the code unit 20, such as harmonic of the BOC and BOC-cos subcarriers. The multiplexer 254 can outputs selected one or more among the PRN code and a plurality of subcarriers under the control of controller 60.

While the preferred embodiment of the present invention has been illustrated and described in details, various modifications and alterations can be made by persons skilled in this art. The embodiment of the present invention is therefore described in an illustrative but not in a restrictive sense. It is intended that the present invention should not be limited to the particular forms as illustrated, and that all modifications and alterations which maintain the spirit and realm of the present invention are within the scope as defined in the appended claims.

What is claimed is:

1. A binary offset carrier (BOC) signal acquisition and tracking apparatus comprising:
    a code unit generating a BOC subcarrier, a harmonic BOC subcarrier and a PRN code, outputting the BOC subcarrier, and selecting to output the harmonic BOC subcarrier or the PRN code according to a control signal;
    a controller generating the control signal to control the code unit to output the harmonic BOC subcarrier or the PRN code; and
    a code delay estimator receiving a signal, calculating an autocorrelation result by correlating the received signal with the BOC subcarrier, and calculating a cross-correlation result by correlating the received signal with the harmonic BOC subcarrier or with the PRN code, and combining the autocorrelation result and the cross-correlation result to generate a combined correlation result.

2. The apparatus of claim 1, further comprising a carrier unit generating a carrier.

3. The apparatus of claim 2, wherein the code delay estimator further removes a carrier component from the received signal by using the carrier from the carrier unit.

4. The apparatus of claim 1, wherein the harmonic BOC subcarrier is a BOC-cos subcarrier with respect to the BOC subcarrier.

5. The apparatus of claim 1, wherein the controller controls the code unit to output the harmonic BOC subcarrier in a signal acquisition mode.

6. The apparatus of claim 1, wherein the controller controls the code unit to output the PRN code in a signal tracking mode.

7. The apparatus of claim 1, wherein the code unit further comprises:
    a multiplexer receiving the harmonic BOC subcarrier and the PRN code, and selecting to output the harmonic BOC subcarrier or the PRN code according to the control signal.

8. The apparatus of claim 1, wherein the code delay estimator comprises a combination unit, the combination unit generates the combined correlation by squaring the autocorrelation result, squaring the cross-correlation result, and subtracting the squared cross-correlation result multiplied by a coefficient from the squared autocorrelation result when the code unit outputs the PRN code.

9. The apparatus of claim 1, wherein the code delay estimator comprises a combination unit, the combination unit generates the combined correlation by squaring the autocorrelation result, squaring the cross-correlation result, and adding the squared cross-correlation result multiplied by a coefficient to the autocorrelation square when the code unit outputs the harmonic BOC carrier.

10. A binary offset carrier (BOC) signal acquisition and tracking method comprising steps of:
    generating a BOC subcarrier, a harmonic BOC subcarrier and a PRN code;
    outputting the BOC subcarrier;
    selecting to output the harmonic BOC subcarrier or the PRN code according to a control signal generated by a controller;
    receiving a signal;
    calculating an autocorrelation result by correlating the received signal with a BOC subcarrier;
    calculating a cross-correlation result by correlating the received signal with the harmonic BOC subcarrier or with the PRN code; and
    combining the autocorrelation and the cross-correlation to generate a combined correlation result.

11. The method of claim 10, wherein the harmonic BOC subcarrier comprises a BOC-cos subcarrier with respect to the BOC subcarrier.

12. The method of claim 10, further comprising generating a carrier.

13. The method of claim 12, further comprising removing a carrier component from the received signal by using the carrier.

14. The method of claim 10, wherein the control signal selects to output the harmonic BOC subcarrier in the signal acquisition mode.

15. The method of claim 10, wherein the control signal selects to output the PRN code in the signal tracking mode.

16. The method of claim 10, wherein the combined correlation is generated by squaring the autocorrelation result, squaring the cross-correlation result, and subtracting the squared cross-correlation result multiplied by a coefficient from the squared autocorrelation result when the PRN code is selected and outputted.

17. The method of claim 10, wherein the combined correlation is generated by squaring the autocorrelation result, squaring the cross-correlation result, and adding the squared cross-correlation result multiplied by a coefficient to the squared autocorrelation result when the harmonic BOC carrier is selected and outputted.

18. A binary offset carrier (BOC) signal acquisition and tracking apparatus comprising:
    a code unit generating a BOC subcarrier, and selecting to generate a harmonic BOC subcarrier or a PRN code according to a control signal;

a controller generating the control signal to control the code unit to generate the harmonic BOC subcarrier or the PRN code; and a code delay estimator receiving a signal, calculating an autocorrelation result by correlating the received signal with the BOC subcarrier, and calculating a cross-correlation result by correlating the received signal with the harmonic BOC subcarrier or with the PRN code, and combining the autocorrelation result and the cross-correlation result to generate a combined correlation result.

19. The apparatus of claim 18, wherein the controller controls the code unit to generate the harmonic BOC subcarrier in a signal acquisition mode.

20. The apparatus of claim 18, wherein the controller controls the code unit to generate the PRN code in a signal tracking mode.

* * * * *